Sept. 30, 1958  R. D. DODGE  2,854,123
POWER OPERATED TABULATING MECHANISM
Original Filed May 8, 1952  6 Sheets-Sheet 1

FIG. 1

INVENTOR
RONALD D. DODGE
BY
Joseph B. Taphorn
ATTORNEY

Sept. 30, 1958      R. D. DODGE      2,854,123
POWER OPERATED TABULATING MECHANISM
Original Filed May 8, 1952      6 Sheets-Sheet 3

FIG. 3

INVENTOR
RONALD D. DODGE
BY
Joseph B. Taylor
ATTORNEY

United States Patent Office 2,854,123
Patented Sept. 30, 1958

2,854,123

POWER OPERATED TABULATING MECHANISM

Ronald D. Dodge, Poughkeepsie, N. Y.

Original application May 8, 1952, Serial No. 286,684 Divided and this application February 1, 1956, Serial No. 562,726

4 Claims. (Cl. 197—178)

This application relates to a power operated tabulating mechanism and constitutes a division of an application filed May 8, 1952, and bearing Serial No. 286,684.

A denominational tabulating mechanism, as disclosed and claimed in the aforementioned application, includes a plurality of counter stops, each of which may be individually positioned for engagement by a column stop mounted on a typewriter carriage. A particular counter stop is selected by depressing a corresponding tabulator key, which action first raises the corresponding counter stop and then operates a universal bar which trips a cam actuated mechanism operative to effect movement of the selected and now raised counter stop into the path of a preselected column stop on the carriage where it is held by an associated latching arrangement until engaged by the traveling column stop on the now released carriage. It has been discovered that a too rapid operation or "flicking" of these tabulator keys will allow a selected counter stop to restore before the cam actuated mechanism is operative to effect movement of the raised counter stop into the path of the column stop and hold it there.

Accordingly, it is an object of this invention to provide a power operated tabulating mechanism wherein too rapid operation or "flicking" of the tabulator keys will not result in the faulty operation thereof.

The invention resides in the use of a latch mechanism operative to hold a counter stop in raised position until it passes under the control of the latching arrangement associated with the cam actuated mechanism. This latch mechanism, of which one is provided for each denominational tabulating key and corresponding counter stop, latches up the associated counter stop as soon as it is raised by the initial downward movement of the associated key. It holds it in the raised position until the cam operated mechanism, which is tripped during final downward movement of the key, is operated to effect swinging movement of the counter stop. Thus, an immediate release of the depressed tabulating key will not affect the setting up of the counter stop as the counter stop will be prevented from restoring with the key by the latch mechanism. Advantageously, the latch mechanism holds only so long as needed: the cam actuated mechanism releasing it as soon as the latching arrangement takes over.

Other objects of the invention will be pointed out in the following description and claims and illustrated in the accompanying drawings, which disclose, by way of example, the principle of the invention and the best mode, which has been contemplated, of applying that principle.

The invention disclosed in the drawings has been applied to a well known form of electrically driven power operated typewriting machine known commercially as the "IBM Electric," the type bar operating mechanism of which is disclosed in Patent No. 2,506,444. It will be understood, however, that the invention is not limited to embodiment in a typewriter of the form illustrated but may be embodied in other typewriters upon suitable modification of the various instrumentalities thereof.

As disclosed, the typewriter includes a base 10 upon which are fixed left and right side plates 12 and 14 rigidly connected at their ends to the adjacent ends of front and rear end plates 16 and 18 to form a rigid generally rectangular machine frame. A pair of rails 20 and 22 are disposed across the typewriter frame and secured at their ends to the side plates 12 and 14. The rails are provided with grooves or tracks upon which truck roller assemblies 24 are mounted to support a main carriage generally indicated by the reference numeral 26.

The carriage comprises plates 28 rigidly joined by a channel-shaped member 30 which is also grooved to receive and movably support the carriage on the truck roller assemblies 24. A platen 32 is rotatably mounted on the carriage plates 28.

The carriage is also provided with the usual rack of column stops, generally indicated by the numeral 34, employed in tabulating operations and with the usual means for setting and clearing the stops, and these are described in detail in Patent No. 2,157,053. Briefly, the rack of column stops, hereinafter also designated as the tab rack, includes a bar 36 disposed at the rear of the carriage and attached at its ends to the plates 28 thereof. The bar is provided with a series of vertically aligned slots 38 on its front and rear faces and a column stop 40 is rockably mounted on the shaft for movement in each of the slots. Each column stop is provided with a straight edge portion 40a positionable, as may be best seen in Figs. 1 and 4, in a raised or unset position and in a clockwise or set position in which the straight edge extends vertically. Each column stop is also provided with a lug 40b which cooperates with the corresponding prong of a multiprong spring 42 to retain the stop in either of its positions.

Figure 3:
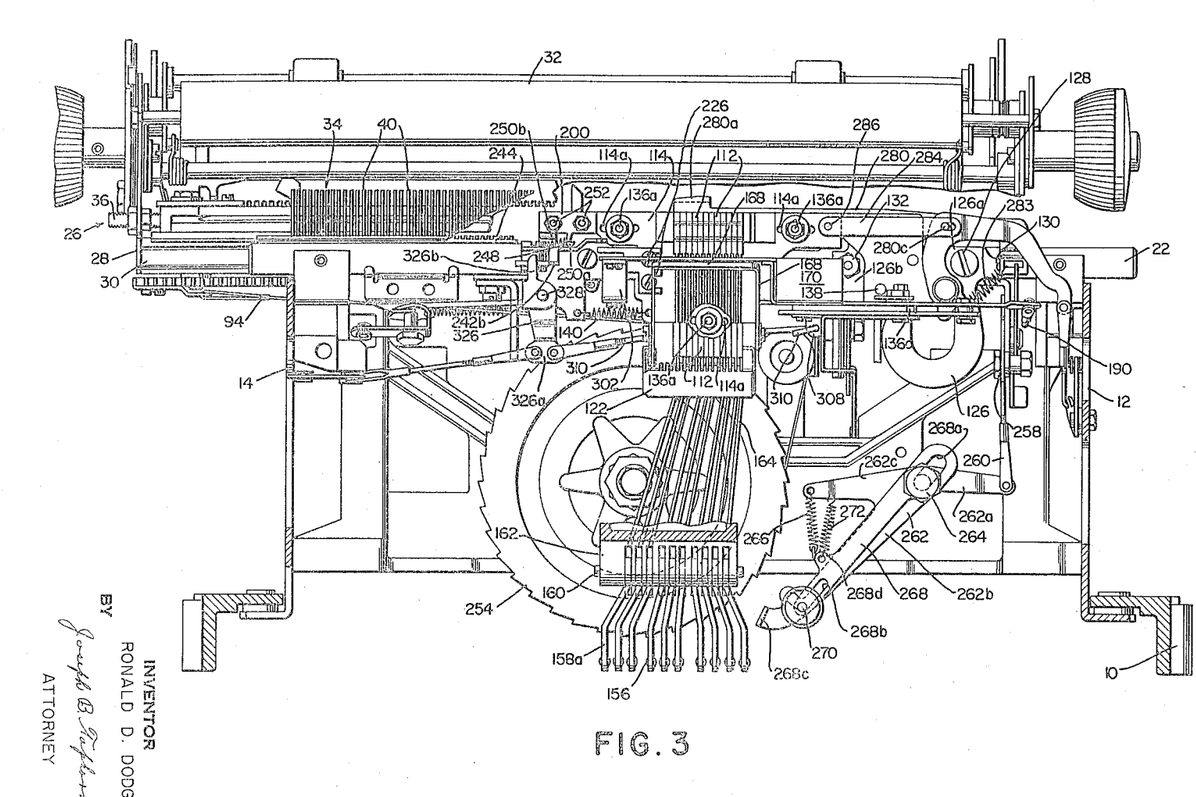
Fig. 3 is a cross section through the machine taken substantially on the line 3—3 of Fig. 2.
Figure 4:
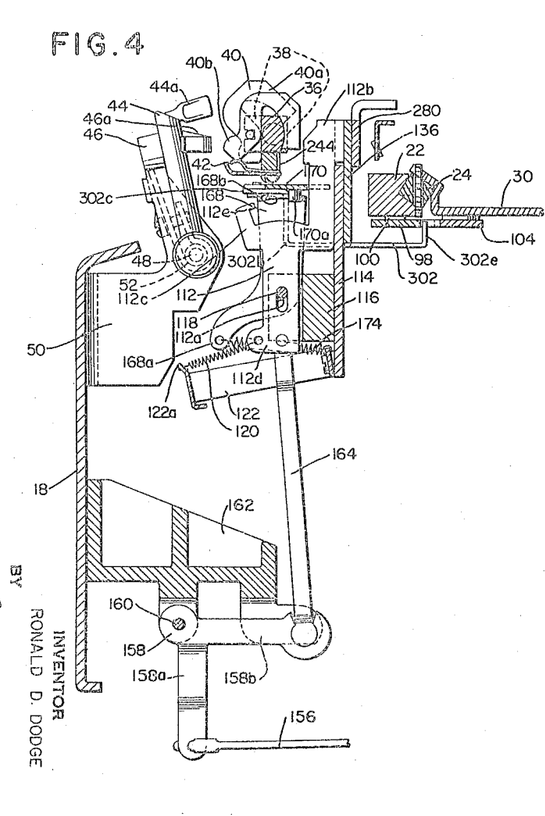
Fig. 4 is a large scale vertical section of a portion of the machine taken on line 4—4 of Fig. 2.

The means for setting and clearing the stops include a special setting lever 44 for shifting the column stops from the unset to the set position and a clearing cam lever 46 for restoring said column stops to the raised position. The clearing cam lever 46 is fixed to a rotatable sleeve 48 mounted on a bracket 50 secured to the rear end plate 18 and this sleeve is connected through suitable linkage to a clearing key located at the keyboard. The setting lever 44 is fixed to one end of a shaft 52 rotatably received in the sleeve and is connected at its other end by a suitable linkage to a setting key at the keyboard. Whenever the setting key is depressed it rocks the setting lever forward so that its head 44a engages a particular column stop, disposed in front of it by the position of the carriage, above its pivotal point so as to rock it clockwise as seen in Fig. 4 from the raised or unset position to the set position.

The clearing lever 46 has a cam portion 46a in the form of a V-shaped bend providing two cam surfaces designed to engage the lug of the set stops. Whenever it is desired to clear a particular set stop, the stop is positioned opposite the apex of the clearing key cam and the clearing key is depressed to rock the cam lever forward to engage the lug of the respective column stop and rotate it counterclockwise. However, when it is desired to clear all of the set column stops, all that is necessary is to hold the clearing key depressed while the carriage is moved across the machine, for the lateral movement of the cam surfaces is effective upon the lug of each set column stop to rotate it counterclockwise to its raised or unset position.

Figure 1:
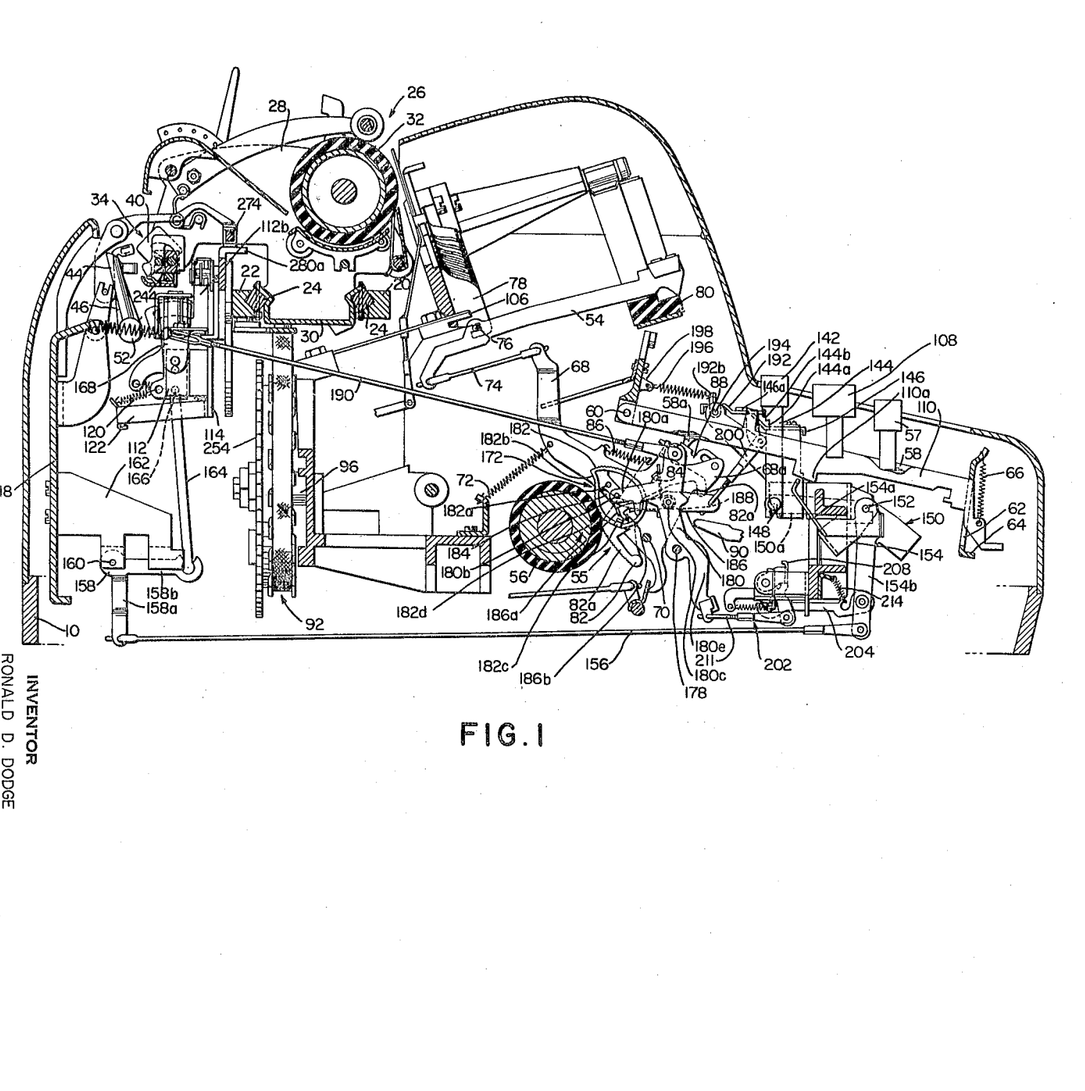
Fig. 1 is a longitudinal section through a typewriting machine embodying the invention.

Since the type bar operating power mechanism is now well known in the art, only a very brief description thereof will be given. The type bars, illustrated by the single type bar 54 in Fig. 1 are operated by a power unit 55 engageable with a continuously-rotatable electric-motor-driven roller 56 upon actuation of corresponding character keys such as 57. The character keys are mounted on levers 58 pivoted at one end on a cross rod 60 and slidably disposed at the other end in slots 62 formed in a transverse bar 64 fixed to the machine frame. The levers 58 are biased to a normal raised position by a spring 66 reacting between the cross bar 64 and each lever 58.

The power unit 55 for each separate type bar and its character key includes a sublever 68 pivoted on a cross rod 70 suitably mounted in the machine frame. The sublevers 68 are retained in a normal position by means of springs 72 urging them in a counterclockwise direction as seen in Fig. 1. Links 74 connect the sublevers 68 to the type bars 54 which are pivotally mounted in a well known way on a curved fulcrum wire 76 in the usual segment 78. It is evident the normal position of the sublevers is determined by the engagement of the type bars with the usual curved type rest 80.

The sublevers are rocked by the engagement of operating cams 82 mounted thereon with the power roller 56. These operating cams are generally L-shaped in construction and are pivoted at 84. A spring 86, attached at one end of the cam and at its other end to the sublever 68, biases the cam counterclockwise and acts to hold a tread bearing portion 82a of the cam out of engagement with the power roller. An interposer 88 is pivotally and slidably mounted on an extension 68a of each sublever and is biased clockwise and to the left into engagement with a lug formed on the sublever extension. The cam normally rests against an edge of the interposer.

When a character key is depressed, a lug on the corresponding lever urges the interposer counter clockwise which urges the cam clockwise until the tread of the cam engages the power roller rotating in the direction of the arrow. The tread is eccentric with respect to the cam pivot 84, so that rotation of the cam urges the cam pivot to the right and rocks the sublever in a clockwise direction to actuate the related type bar to the printing position. Subsequently, an extension 82a of the cam will strike a finger stop 90 and by sliding along the finger stop will effect the positive disengagement of the cam from the power roller.

The platen supporting carriage 26 is biased for movement in a letter spacing direction. A spring motor, generally indicated by the numeral 92, is connected by a tape 94 to the carriage 26 so as to provide the impetus for such movement. The spring motor is mounted on a stud 96 carried by the framework and may be of the type disclosed in Patent No. 2,157,053.

An escapement mechanism normally operates to hold the carriage against movement by the spring motor. It includes a pawl 98 (Fig. 5) having a slot 98a through which it is pivotally and slidably mounted beneath the rear rail on a fixed stud 100. The pawl is biased in a clockwise direction and in a direction counter to the letter spacing direction by a spring 102 connected to a lug 98b thereof. The pawl cooperates with an escapement rack 104 fixed to the under side of the channel-shaped portion 30 of the carriage and normally engages a tooth 104a thereof. In the normal position, the pawl engages the rack to hold it fixed and is held by the rack at the limit of its movement in the letter spacing direction as determined by the engagement of the stud 100 with an end of the slot 98a.

The pawl is moved out of contact with the rack upon each striking of the type bar. A universal bar 106 is operatively disposed in the path of each of the type bars for rearward movement thereby. It is connected by a suitable link and trip lever (both not shown) with the pawl so as to rotate it out of engagement with the rack when the type bar is struck. However, once the pawl is moved out of contact with the rack, the spring moves it in a direction counter to the letter spacing direction until the stud 100 engages the other end of the slot 98a. At this point the pawl has been moved out of contact with the trip lever so that the pawl may re-engage the next tooth on the rack to stop the carriage after it has advanced one letter space.

Figure 2:
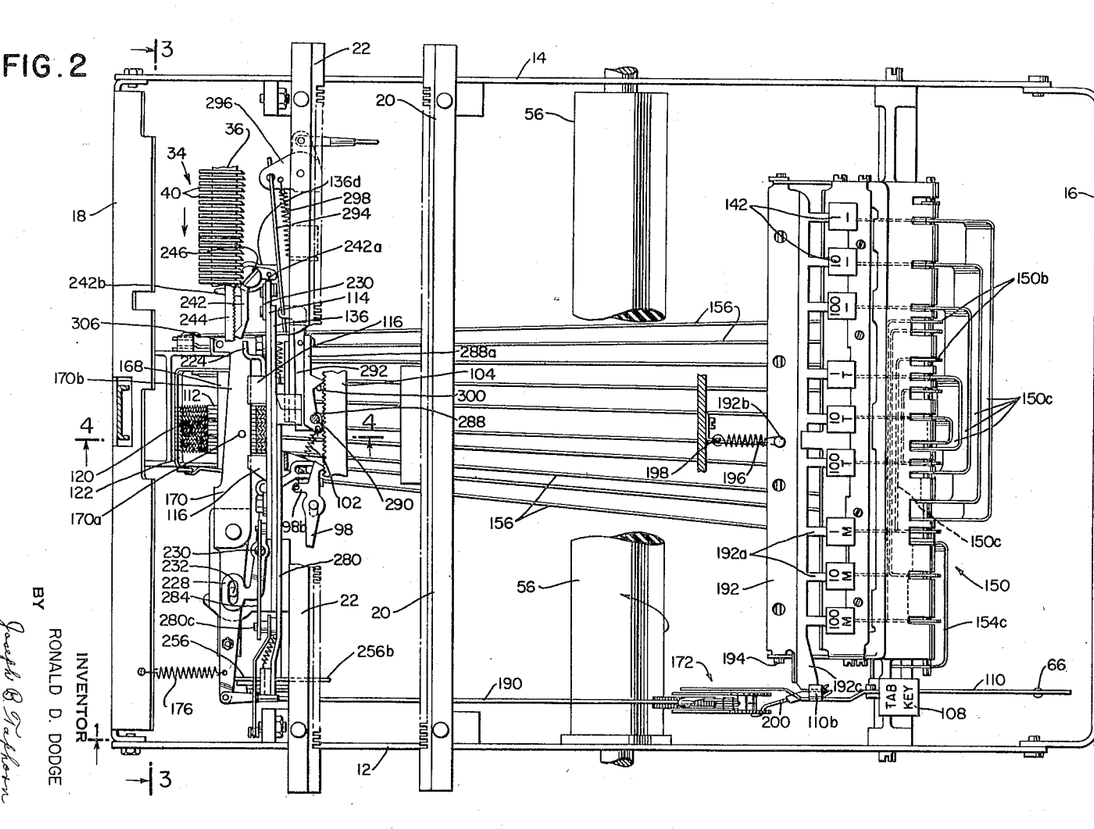
Fig. 2 is a fragmentary plan view of the machine shown in Fig. 1 with parts broken away to show the denominational tabulating mechanism.

Typewriters are ordinarily furnished with tabulating mechanisms of the non-denominational kind such as that disclosed in Patent No. 1,935,436. In such tabulating mechanisms, a tabulating key, such as 108, is mounted on a lever 110 similar to the character key levers and disposed at the left-hand end of a keyboard (Fig. 2). The key directly controls a power unit operative to dispose a single counter stop in the path of a set column stop.

It is a feature of this denominational tabulating mechanism to retain the location of this tabulating key and its tabulating function for the convenience of operators accustomed to the use of and perhaps intermittently using typewriters embodying the usual non-denominational tabulating mechanism, while incorporating it into the new denominational tabulating mechanism.

The denominational tabulating mechanism herein disclosed enables direct tabulation of the carriage to any of ten different typing positions for every set column stop. It embodies the use of a bank of ten counter stops 112, each of which is positionable by a corresponding tabulating key during the initial portion of its depression for movement into the path of a set column stop by a means controlled by power means actuated during the final portion of the key depression.

The bank of counter stops 112 is mounted in a carriage located in back of the rear carriage rail 22. The carriage comprises a support member 114 having vertically aligned upper and lower pairs of laterally aligned guide portions 116 on its back side, and a shaft 118 extending between the lower pair of the guide portions.

Each counter stop is a generally flat Y-shaped construction in which one branch portion 112b serves to engage a set column stop and the other, 112c, serves to engage the means controlled by power means. Each is formed with a longitudinally extending slot in its base portion by which they are assembled in flatwise relation upon the shaft 118 of the carriage. Springs 120 react between lugs 112d formed on the lower end of each counter stop and the corresponding prong 122a of a multipronged member 122 secured to the lower portion of the back side of the support member 114 to urge the counter stops downwardly and angularly on the carriage until the upper end of their slots 112a rests on the shaft 118 and the longer column stop engaging branch 112b engages the back side of the support member 114. In this normal or inactive position a counter stop is disposed out of the path of the column stop, and as will be seen, will not be swung thereinto upon the operation of the means controlled by power means for another counter stop that has been positioned.

The guide portions of each laterally aligned pair are spaced apart the precise distance necessary to snugly but slidably accommodate between them the counter stops 112, which are one letter space in thickness, and two spacer elements 124 constructed generally similar to each of the counter stops. The desirability for such spacer elements arises by way of the fact that there is no need that any of the ten typing positions be utilized for printing of the commas that separate the millionth from the hundred thousandth denominational order and the thousandth from the hundredth denominational order in numbers, since numbers are never started with commas. Thus by inserting the dummy counter stops or spacer elements between counter stops representative of the hundredth and thousandth denominational orders and between the hundred thousandth and millionth denominational order, the denominational tabulating mechanism, capable of tabulation to any of ten selected typing positions, will accommodate the printing of columns of numbers varying from amount positions of the hundred millions down through units to the decimal figures, as the printing of all decimal figures is begun at the decimal point.

It should be noted that the spacer elements are biased by springs 120 in the same manner that the counter stops are. It has been found expedient to eliminate thereon the branch portion 112c found on the counter stops to insure that they will not be moved into the path of the column stop since they are not connected with any positioning mechanism which will exert sufficient additional drag to insure against their being raised, that is, positioned, by frictional contact with an adjoining counter stop that is being raised or positioned.

The counter stop carriage is slidably and yieldably supported upon the rear rail 22 for movement in a path parallel to that of the main carriage. A resilient U-shaped bracket member 126 is firmly secured, at the end of one of its legs, 126a, to the rear rail 22 by a screw fastening 128 (see Fig. 3) and a dowel pin 130. The end of the other leg, 126b, of the U-shaped member is held to the rail by a screw fastening 132 of smaller diameter than the aperture through which it extends in the leg so that the leg may undergo yielding displacement. A spacer element 134 separates a frame member 136 from the movable leg 126b of the bracket 126 and these three are united by rivets 138 into one integral unit. The frame member 136 is provided with three stud-like fastenings 136a, and the counter-stop carriage is slidably supported on these fastenings by means of slots 114a formed in the support member 114. A spring 140 is connected at one end to the support member 114 and at its other end to a depending extension 136b of the frame member, and urges the counter stop carriage in a direction counter to the letter spacing direction of the main carriage.

The keys for controlling the selective operation of each of the ten counter stops include the usual tabulating key 108 and a set of nine special keys 142 mounted in a row above the numeral row on the keyboard. Each of the special keys 142 is mounted upon the upper end of a key stem 144 slidably disposed in a slotted member 146 fixed to the machine frame. The lower end of each key stem 144 is forked and receives a pin 148 carried by one arm 150a of a bell crank 150. Each of the bell cranks 150 is pivoted on a transversely extending shaft 152 and is so mounted that its other arm 150b extends downwardly.

It is a feature of this denominational tabulating mechanism that the special or denominational keys 142 are arranged in the same sequence as the typing positions determined by their operation appear at the striking point of the machine. This result has been obtained by inversely connecting the bell cranks of the nine special keys with the nine right-hand counter stops (Fig. 2). Each bell crank has its depending arm 150b offset from its horizontally extending arm 150a by a bail-like extension 150c which rigidly interconnects them. As best seen in Fig. 2, the bell cranks for the keys 100M, 10M, 1M, and 100T; representative of the 100,000,000; 10,000,000; 1,000,000 and 100,000 denominational orders; are each provided with a bail-like extension which disposes their depending arms 150b to the right and inversely of their key order. Similarly, the bell cranks for the keys 10T, 1T, 100, 10 and 1; representative of the 10,000; 1,000; 100; 10 and unit denominational orders are each provided with a bail-like extension disposing their depending arms to the left and inversely of their key order.

The usual tabulating key 108 is connected with the left-hand counter stop, that is, the one that allows the main carriage to travel all the way to the decimal point before it is stopped, by a bell crank 154 likewise mounted on the shaft 152. An arm 154a has its free end disposed in the path of a lug 110a formed on the key lever 110 for counterclockwise rocking thereby. The depending arm 154b is similar to the depending arms 150b of the bellcranks for the special keys and is also offset from the arm 154a by a bail-like extension 154c but only to dispose it adjacent the depending arms 150b.

Each of the bell cranks 150 and 154 is operatively connected with the corresponding counter stop for the respective key to raise the counter stop when the key is depressed. A link 156 extends rearward from a pivotal connection with the lower end of each of the depending arms of the bell cranks to where it is connected with the depending arm 158a of the bell crank 158 pivotally mounted on a shaft 160 carried by a bracket 162 mounted on the rear end wall 18 of the machine frame. Each bell crank 158 is provided with a horizontally extending arm 158b having a ball and socket connection with the lower end of a link 164 pivotally connected at its upper end at 166 with the lower end of the corresponding counter stop 112. It will be evident that when a tabulating key is depressed, the corresponding bell crank 150 or 154 is rotated counterclockwise to pull a link 156 forwardly and rock the corresponding bell crank 158 counterclockwise so that its horizontally extending arm 158b shoves a link 164 upward and raises the corresponding counter stop 112 to position it.

After the selected counter stop 112 has been positioned, the means controlled by a power means is brought to bear upon it. The means controlled by a power means includes a bail member 168 biased for movement from a normal position into engagement with the shorter branch 112c of a raised counter stop 112 to move the branch 112b into the path of a column stop, an operating lever 170 biased to a normal position in which it holds the bail member in its normal position, and a cam unit, generally indicated at 172, connected with the operating lever to move it from its normal position to release the biased bail member.

The bail member 168 is supported on the counter stop carriage. It comprises a generally U-shaped construction having its legs pivotally mounted on the shaft 118 so as to dispose its bight portion slightly above the notches formed between the branches 112b and 112c of the counter stops when the counter stops are in their normal positions. The bail member is biased for movement from normal position by a spring 174 reacting between an extension 168a of one of the arms of the bail member and an inturned portion of the U-shaped prong member 122 secured to the rear side of the support member 114. It will be observed that the clearances between the bight portion of the bail member and the upper edges of the shorter branches 112c of the counter stops in their normal positions are sufficient to permit movement of the bail member without disturbing the counter stops. However, when a counter stop has been raised, the shorter branch member 112c will be disposed in the path of movement of the bight portion of the bail member with the result that the bail member, when released to move under the influence of its spring 174, will swing the raised counter stop about the shaft 118 to dispose the longer branch 112b thereof in the path of a set column stop. When the bail member 168 restores to normal position, the forward edge of its bight portion may engage the rearward edge of the longer branch portion 112b and assist the corresponding spring 120 in swinging the counter stop clockwise. Springs 214 and 196 may assist the spring 120 and the gravitational forces in restoring the counter stop and the associated key linkage to normal position. A projection 112e is formed on the end of the shorter counter stop branch 112c to engage the upper surface of the bail member and prevent restoration of the counter stop when the tabulating key is released by an operator before the bail member is restored to normal position.

The operating lever 170 is supported for horizontal swinging movement behind the rear carriage rail 22. The frame member 136, resiliently mounted upon the rear rail by the U-shaped bracket 126, is formed with a laterally extending flange 136c having an upstanding stud 136d upon which the operating lever is pivotally mounted. A spring 176 is connected at one end to the left-hand end of the operating lever and at its other end to the rear end plate 18 and acts to bias the lever to its normal position.

The operating lever 170 acts to hold the bail member 168 in its normal position by means of a one-way connection. A stud 170a is fixed to the underside of the operating lever and cooperates with a much larger generally rectangular hole 168b formed in the bight portion of the bail member 168. The stud and the hole are so positioned that when the operating lever is moved to its normal position, the stud engages the forward side of the hole to move the bail member to its normal position and hold it there out of the upward paths taken by shorter branches 112c when the counter stops are positioned. On the other hand, the hole is of such depth that when the operating lever is moved from its normal position by the power unit, it will not be engaged by the stud during its operative movement. Hence, the bail member moves under the influence of its own biasing spring 174 when it is released, and should a column stop be positioned directly opposite a selected counter stop, no damage will occur by reason of the forceful operation of the power unit. The spring 174 exerts a yielding force which delays completing the movement of the selected counter stop into the path of the set column stops until the column stop engaged by the counter stop during outward movement has moved beyond the counter stop. The rectangular shape of the hole accommodates movement of the counter stop carriage relative to the operating lever.

The power unit 172 is operative to move the operating lever 170 from its normal position a distance sufficient to allow the bail member 168 to move a raised counter stop into the path of a set column stop. It is driven, when actuated, by the continuously rotatable power roller 56 and for this reason is pivotally mounted on a nearby stud 178 fixed to the machine framework. It includes an elongated frame member 180, a rotatable cam 182, a biased arm 184, and a trip lever 186. The frame member 180 is formed out of spaced plates riveted to form a rigid unit and is pivoted on the stud 178 fixed to the framework. The frame member has an extended portion 180a having a shaft 180b on which a single-lobe cam 182 is rotatably mounted. A pin 182a projects laterally from one side of the cam and is so located with respect to the recessed portion 182b of the cam as to be engaged when the recessed portion is disposed toward the power roller, by the biased arm 184 extending beneath the cam shaft 180b from a pivot point on a second shaft 180c carried by the frame member 180. The arm is biased toward the cam shaft by a torsion spring 188 coiled around the shaft 180c and hooked to lugs formed in the arm and in the frame member.

The trip lever 186 controls the operation of the power unit. This lever, while disposed on the side of the cam 182 opposite that of the arm 184, is likewise pivotally mounted on the shaft 180c so that its free end extends beneath the cam shaft 180b. This end is provided with the two offset lugs 186a and 186b spaced radially and angularly of each other with respect to the cam shaft 180b so as to be alternately disposed in the path of a pin 182c projecting laterally from that side of the cam. This pin 182c is so related to the pin 182a on the other side of the cam that when one or the other of the lugs engages it, it will stop the rotation of the cam when the pin 182a has depressed the arm and moved past a dead center relationship with it to a position in which the arm now urges the cam further in the same direction. Normally, the pin 182c rests against the more advanced lug 186a of the trip lever because of the action of the biased arm upon the pin 182a, and when the trip lever 186 is rocked so that its free end is moved toward the cam shaft 180b, the pin 182c is released and the cam rotates a slight distance sufficient to engage the tread surface 182d of the cam with the surface of the power roller 56. The continuously rotating power roller then drives the cam through approximately one revolution until the recessed portion 182b is again disposed toward it. At this time the pin 182c is stopped by the outer lug 186b if the trip lever has not been restored to its normal position and by the inner lug 186a if the lever has been restored. In the latter event, the subsequent restoration of the trip lever results in a transfer of the pin 182c from the outer lug to the inner lug and a very slight rotation of the cam because of the action of the biased arm 184 on the pin 182a.

The power unit is made operative to shift the operating lever 170 by making the tread portion 182d of the cam eccentric with respect to the cam shaft 180b. Thus, when the cam is rotated, it acts to shift the shaft 180b away from power roller and rock the frame member 180 about its fulcrum or pivot on the shaft 178. This rocking of the power unit is transferred by a link 190 to the operating lever 170 to move it from its normal position. The cam unit 172 is restored when the operating lever is restored to its normal position by the action of spring 176.

The power unit is actuated during the final portion of the depression of a tabulating key to insure that the corresponding counter stop has already been positioned. To this end, a lost motion connection is provided between the trip lever 186 and each key stem 144 so that the initial portion of the total movement permitted each key stem by the notched portion 144a of the stem acts only to position the counter stop. A common power unit actuating member 192 is pivotally mounted on a shaft 194 carried by the framework and is provided with prongs 192a engageable by offsets 144b formed in the respective key stems. The common power unit actuating member 192 is biased upward by a spring 196 reacting between a boss 192b formed thereon and a lug 198 fixed to the machine framework toward a stop member 146a constituting an extension of the slotted member 146. The stop member 146 disposes the member 192 so that its prongs 192a are engaged by the offsets 144b of the key stems only after the latter have undergone some movement. In this way the counter stop positioning takes place before the member 192 is depressed to rock the trip lever 186 through a connecting link 200 so as to move the trip lever lug 186a toward the cam shaft 180b to release the cam 182 and operate the power unit. It will be evident that spring 196 acts to restore the trip lever as well as the actuating member 192 when the key is released.

Since the usual tabulating key 108 is mounted on a lever 110 off to one side from the special tabulating keys 142, a special connection must be provided between it and the actuating member 192. This connection consists of a laterally extending prong 192c disposed in the path of downward movement of lug 110b formed on the lever 110. A sufficient distance is provided between the normal positions for the lug and the prong to accommodate the positioning of the corresponding counter stop before the power unit is actuated.

A latch mechanism, generally indicated by the numeral 202, is associated with each of the counter stop positioning means to prevent the return of a raised counter stop before the operating bail is released. This problem arises when the key is "flicked," that is, depressed and released very rapidly, or is struck so hard as to cause the counter stop to overthrow and attempt to rebound to its original position.

Figure 8:
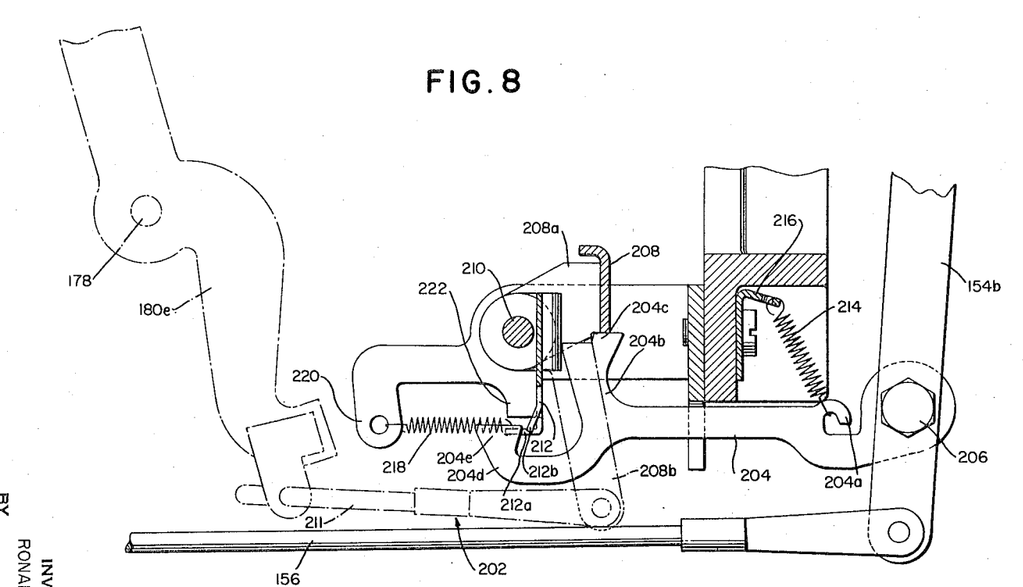
Fig. 8 is an enlarged view, partly in section, of a portion of the machine shown in Fig. 1.

As best seen in Figs. 1 and 8, each latch mechanism 202 includes a latch member 204 pivoted at one end by a suitable fastening 206 to the depending arm 154b of the respective bell crank 150, a bail member 208 pivotally mounted on a fixed shaft 210 and operatively connected to the power unit, and a guide vane 212. The latch member 204 is biased upward toward the bail member and the guide vane by a spring 214 reacting between a lug 204a on it and a lug 216 on a fixed part of the machine frame and is provided with an extension 204b having a step portion 204c and a second extension 204d terminating in an upwardly directed hook portion 204e having a flat upper edge and a generally vertical side edge. The step portion 204c of the latch member normally engages the bottom side of the bail member 208 under the action of the spring 214. The latch bail 208 is formed of a transverse member having bent over parallel end plates 208a pivotally mounted on the shaft 210 and an arm 208b pivotally connected by a link 211 with an extension 180e of the power unit frame member 180. The guide vane 212 is pivotally mounted on the same shaft 210 and is biased in a rearward direction by a spring 218 reacting between a lug 212a formed on it and a lug 220 fixed on a portion of the machine frame toward a fixed stop 222. The vane is formed with a series of downwardly extending prongs 212b for engaging the hook-shaped portion 204e of the latch member.

When a bell crank 150 is rocked to raise a counter stop, the latch member is pulled forward so that the stepped portion 204c no longer is disposed beneath the bail member but in front of it where it acts to prevent return movement of the latch member and hence to hold the bell crank out of normal position and in a condition in which the corresponding counter stop is held raised. At the same time that the latch member was displaced, the vane was swung forward away from its stop 222 against the action of its spring 218 by the forward vertical edge of the hook portion 204e of the latch member.

The bell crank is unlatched only after the power unit 172 has been operated. When the power unit is operated, the lower extension 180e of the frame member is swung backward and through the link 211 acts upon the arm 208b of the bail member 208 to swing the bail member downward. This downward swinging of the bail member 208 effects a downward swinging of the latch member 204 against the action of the spring 214. When the latch member has been swung to a point where the flat upper edge of the hook portion 204e is beneath the lower edge of the corresponding prong 212b on the guide vane 212, the vane restores to its normal position in engagement with the stop 222 and disposes the prong above the flat upper edge of the hook portion. Thus, when the power unit restores to its normal position and rocks the bail member 208 upward, the latch member does not follow because of the engagement of the guide vane by the upper edge of the hook portion. As soon as the bail member has been raised above the surface of the step portion 204c, the latch mechanism 202 is unlatched since the latch member will be held out of contact with the bail member until the upper edge of the hook portion slides off the guide vane prong. Restoration of the latch member and the corresponding tabulating key under the action of the latch member spring 214 and the counter stop spring 120 will be delayed, however, until the lip 112d of the selected counter stop is disengaged from the biased bail member 168.

The movable mounting of the support member 114, constituting the counter stop carriage, furnishes the means by which a selected counter stop 112 is held in the path of a set column stop until after engagement by it. The means includes a latching mechanism for temporarily preventing the means controlled by a power means from restoring to its normal position after it has moved a positioned counter stop into the path of a set column stop.

As shown, the latching mechanism is obtained by making one end 170b of the operating lever 170 T-shaped and providing a cooperating slotted member 224 on the support member 114. The slotted member is firmly, though adjustably, mounted on the support member by screws 226 so that its bifurcated portion extends rearwardly and to the right to receive the forwardly extending portion 170c of the operating lever. When the operating lever is in normal position, the forward portion 170c of its T-shaped end 170b extends through the slotted member and is engaged on its left side edge by a non-slotted portion of the slotted member. In this manner the counter stop carriage is held in its normal position against the reaction of its spring 140, and the normal position of the operating lever is determined by the engagement of the body portion of the T-shaped end of the operating lever with the bottom of the slot in the slotted member. Movement of the operating lever from its normal position withdraws the forward portion 170c from the slot a distance sufficient to clear its left side edge of the non-slotted portion of the slotted member and enables the counter stop carriage to move to its advanced position. The operating lever is now prevented from returning to its normal position under the action of the spring 176 by the engagement of the front edge of the forward portion 170c with the bottom of the slot in the slotted member.

It will be remembered that the selected counter stop remains in the path of a set column stop as long as the biased bail member 168 is not returned to its normal position. Hence, as long as the operating lever is held out of its normal position because of the advanced position of the counter stop carriage, the selected counter stop will remain in the path of set column stop.

The operating ever is restored to its normal position when the counter stop engages a set column stop. The momentum of the main carriage causes the column stop to move the counter stop carriage through its normal position until it is stopped by the engagement of the studs 136a on the frame member 136 with the ends of the slots 114a in the support member. This movement of the counter stop carriage withdraws the non-slotted portion of the member 224 from in front of the front edge of the forward portion 170c of the operating lever and allows the operating lever to restore to normal position. As pointed out hereinbefore, this action restores the means controlled by a power means to normal position and allows the selected counter stop to do the same. The counter stop carriage will be held in normal position again by the engagement of the non-slotted portion of the member 224 with the left side edge of the forward portion 170c of the operating lever.

Figure 5:
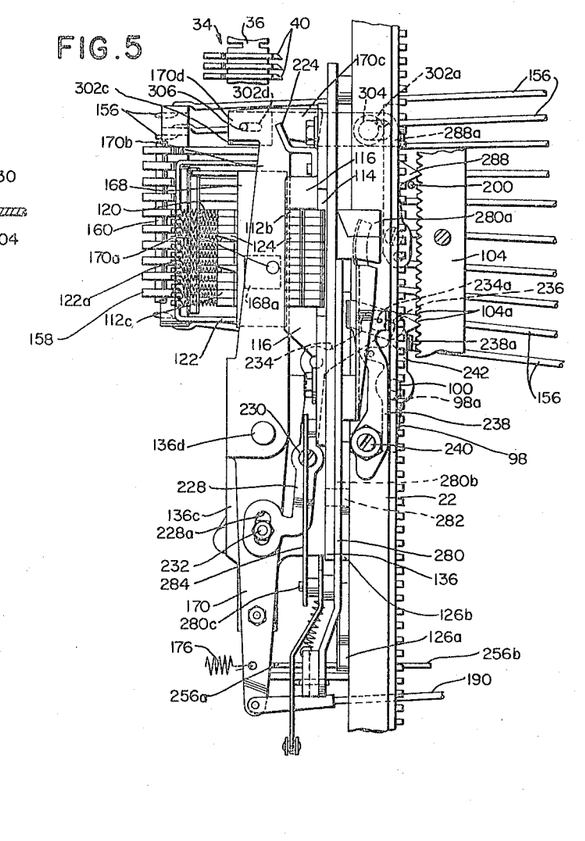
Fig. 5 is an enlarged view of a portion of the machine shown in Fig. 2.

The carriage is released for an excursion in a letter spacing direction concurrently with the swinging of the selected counter stop into the path of a set column stop. To do this, the operating lever 170 is connected with the escapement mechanism provided for the typewriter. As best seen in Fig. 5, a compound lever 228, secured by a screw fastening 230 to the lateral extension 136c of the frame member 136, is pivotally and slidably connected by a slot 228a formed in one end thereof to a stud 232 fixed on the operating lever 170. The other end of the compound lever is pivotally connected to a link 234. The link is slotted at 234a in its other end to receive a stud 236 fixed on a horizontal portion extending beneath the rear carriage rail 22 of a lever 238 pivoted at one end to the top of the rail by a stud-like fastening 240. The other end of the lever 238 is formed with an ear 238a which projects upward into the path of movement of the toothed escapement pawl 98 so that when the lever 238 is swung about its pivot 240 the escapement pawl is withdrawn from the escapement rack 104. Upon the withdrawal of the escapement pawl by the movement of operating lever 170 from normal position, the carriage is moved under the impetus imparted to it by the tape 94 connected to the spring motor 92 until it is stopped by the engagement of a set column stop with a counter stop disposed in the path of the column stop. The escapement pawl restores when the operating lever restores.

In the interest of high speed typing operations, it is desirable that a tabulating operation be completed as rapidly as possible. To accomplish this, it is necessary that the main carriage 26 be permitted to attain a reasonably high velocity during its excursion. It results then that a set column stop 40 engages a selected counter stop 112 with considerable momentum so that a tendency arises for the carriage to bounce back several letter spaces. Accordingly, provision is made for momentarily locking the carriage in the selected typing position on the machine frame at the end of the tabulating operation. A novel mechanism acts to prevent rebound of the carriage after the counter stop carriage has been moved to its limiting position in a letter spacing direction against the bias of its spring 140 by the main carriage. The escapement mechanism, in the event that the counter stop has restored, will prevent further movement of the main carriage in the letter spacing direction should it rebound from the rebound mechanism.

The novel rebound mechanism includes a toothed pawl 242 located behind the rear carriage rail 22 and a fixed rack 244 carried by the main carriage on the bottom of the tab rack 34. The pawl 242 is pivotally mounted on a stud-like fastening 246 secured to the top of a second lateral extension 136d of the frame member 136 secured upon the rear rail 22 by the U-shaped bracket 126.

The toothed pawl 242 is urged toward engagement with the rack 244 by a spring 248 reacting between an arm 242a formed integrally with the tooth pawl and the lug 250a of a bracket 250 secured by screws 252 upon the counter stop carriage 114. A second lug 250b depends from the bracket 250 into the path of movement of the arm 242a and acts to hold the pawl 242 out of engagement with the rack while the counter stop carriage is in or between its normal and advanced positions. However, when the counter stop carriage is moved past the normal position from the advanced position by the action of a set column stop upon a selected counter stop, the spring 248 causes the arm of the pawl to follow the lug 250b until the toothed end of the pawl engages the rebound rack. Thus, if the main carriage bounces backward, it will be prevented from moving to another typing position by the engagement of the rebound pawl with the rack. After the rebound pawl has stopped the main carriage, it will be moved out of contact therewith by the action of the counter stop carriage restoring to its normal position.

A governor may be provided to prevent the main carriage from attaining excessive velocities during the relatively long excursions involved in the tabulating operation. It may be of the type disclosed in Patent No. 2,353,095 and include a ratchet wheel 254 which normally rotates freely with the spring motor 92 but when it is held against rotation, it exerts a braking force upon the motor, materially decreasing the impetus applied by it to the carriage.

Figures 6, 7:
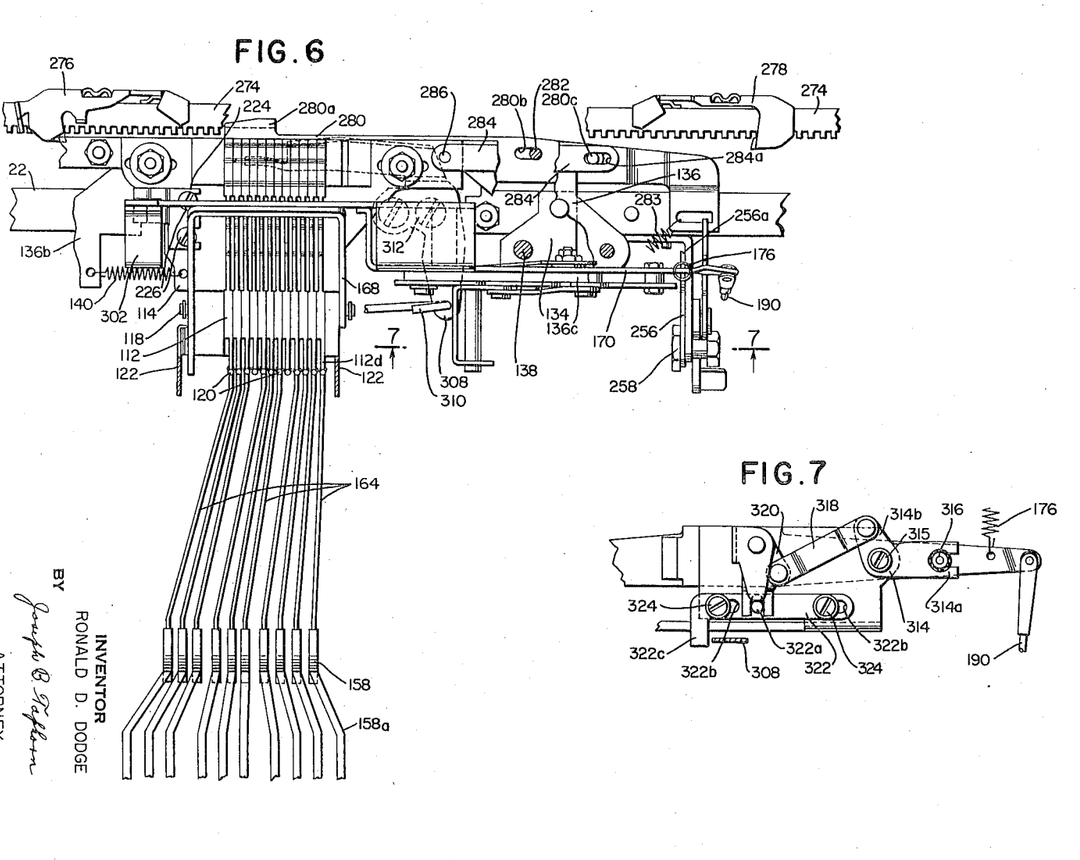
Fig. 6 is a rear elevational view of the portion of the machine shown in Fig. 5.
Fig. 7 is a large scale bottom view taken on the line 7—7 of Fig. 6.

The ratchet wheel 254 is held against rotation during the tabular operation by the action of the operating lever 170. A bell crank 256 is pivotally mounted on a stud 258 (Figs. 3 and 6) secured to the machine frame and has an upstanding arm 256a operatively disposed in the path of movement of the operating lever 170. A link 260 connects the horizontally extending arm 256b of the bell crank with one arm 262a of a three-arm lever 262 pivoted on a stud 264 secured to the machine framework. The three-arm lever 262 is biased by a spring 266 in a counterclockwise direction, as seen in Fig. 3, to a position in which it holds the upstanding arm 256a of the bell crank in the path of movement of the operating lever. A detent 268 for the ratchet wheel is formed with a longitudinally extending slot 268a at one end by which it is pivotally and slidably mounted on the same stud 264 on which the three-arm lever 262 is mounted. The other end of the detent is provided with an L-shaped slot 268b which slidably receives a pin 270 fixed to a second arm 262b of the three-arm lever and provides a guide for moving a bent-over lug 268c on the end of the detent into engagement with the ratchet wheel. A spring 272 is interposed between a lug 268d formed on the detent and an aperture in the third arm 262c of the three-arm lever and urges the detent so that the stud 270 on the second arm of the three-arm lever rests in the bend of the L-shaped slot 268b and the stud 264 secured to the framework rests in the inner end of the longitudinally formed slot. When the three-arm lever 262 is rotated through the bell crank 256 by the movement of the operating lever 170 from normal position, the bent-over lug 268c of the detent is moved into engagement with a tooth of the ratchet wheel to hold the latter against rotation. The length of the slot in the upper end of the detent and that portion of the L-shaped slot which is aligned therewith is such that the ratchet wheel is allowed to turn a tooth space or two before it is finally stopped by the pin and the stud striking the upper ends of the slots in the detent. This allows a few letter spaces of movement of the main carriage before any braking effect is exerted and takes care of extremely short tabulating movements in which it is desired not to have the main carriage retarded to any extent.

It may happen that one of the tabulating keys is depressed when no column stop has been set or after a set column stop has already moved past the corresponding counter stop for the operated key. In such an event there will be an excursion of the carriage until the usual margin stop mechanism provided in the typewriting machine effects a stopping of the carriage movement. It is a feature of this denominational tabulating mechanism to utilize this stopping action of the margin mechanism to effect a restoration of the counter stop carriage and the selected counter stop to their normal positions.

The margin stop mechanism of the type shown includes elements mounted on the carriage and elements mounted on the frame which cooperate with each other to determine the limits of movement of the carriage upon the rails. A margin stop rack 274 is provided on the carriage so as to be above the rear carriage rail 22 and is provided with right and left-hand margin stops 276 and 278, respectively.

On the framework, a drag link 280 is operatively disposed in a position so that a lateral extending portion 280a thereof lies in the path of the right-hand margin stop 276. The drag link 280 is formed with a longitudinally extending slot 280b by which it is slidably and pivotally mounted upon a pin 282 supported by the U-shaped bracket 126 and the frame member 136 in a space occurring above the spacer member 134. The drag link 280 is also provided with a rearwardly extending stud 280c, and a spring 283 urges it in a direction counter to the letter spacing direction to a normal position.

A link 284 connects the drag link with the counter stop carriage. The link is formed at one end with a longitudinally extending slot 284a in which the drag link stud 280c is slidably received. The other end of the link is pivotally connected to a stud 286 fixed to the counter stop carriage. The location and length of the slot 284a in the link 284 is such that the counter stop carriage movements do not disturb the drag link in normal position. It follows that the drag link stud 280c normally occupies an intermediate position in the slot 284a and that when the counter stop carriage is in an advanced position the stud is adjacent the left-hand end of the slot. Thus, when the right hand margin stop encounters the laterally extending portion 280a of the drag link 280 and moves it the length of its slot 280b against the bias of the spring 283, the stud 280c will engage the left-hand end of the slot 284a to move the counter stop carriage only when the counter stop carriage is in advanced position. As soon as the drag link has moved the counter stop carriage to its normal position, the operating lever 170 is unlatched and restores the bail member 168 to normal position, permitting the selected counter stop to do likewise. It will be evident that this movement of the counter stop carriage has the same effect as the movement of it by the engagement of the column stop with the counter stop.

A typewriting machine is usually provided with a back space mechanism operative upon each actuation to move the platen supporting carriage one space in a direction counter to the letter spacing direction. In the embodiment disclosed, the mechanism includes a pawl 288 for engaging the escapement rack 104 and shifting it and the main carriage in a direction counter to the letter spacing direction. The pawl 288 is pivotally mounted upon a stud 290 carried by a slide 292 and has its toothed portion urged toward the rack by the spring 102 which also urges the escapement pawl 98 into engagement with the escapement rack. The slide 292 is connected by a link 294 to a lever 296 pivotally mounted on the bottom of the rear rail 22, and the slide is urged in the letter spacing direction to a normal position by the action of a spring 298 upon the lever 296 tending to rotate the lever in a counterclockwise direction as seen in Fig. 2. The lever 296 is operatively connected to power operated back spacing mechanism (not shown). The depression of the back space key causes the mechanism to effect a rocking of the lever 296 and a shifting of the slide 292 to the right. The back space pawl 288 is normally held from engagement with the rack by a boss 300 fixed relative to the rear rail 22. This boss is slidably engaged by the tooth portion of the pawl which also acts as a cam to hold it out of contact with the escapement rack when the slide occupies its normal position. When the slide is moved from the normal position in a direction counter to the letter spacing direction, the toothed portion of the pawl 288 is moved away from the boss and rotates into engagement with the escapement rack under the action of the spring 102.

To prevent the effective operation of such a back space pawl during the tabulating operation, an interlock is provided between it and the operating lever 170. A U-shaped member 302 is slidably supported beneath the rear rail 22 by a fixed headed fastening 304 received in its longitudinal slot 302a. One leg 302b of the U-shaped member terminates in a laterally extending portion 302c which is slotted at 302d to form a lost motion connection with a stud 306 carried by the rearwardly extending portion 170d of the T-shaped end 170b of the operating lever. The other leg 302e of the U-shaped member 302 extends upward into the path of swinging movement of an extension 288a formed on the back space pawl 288. Normally, the leg 302e of the U-shaped member is held out of the path of swinging movement of the back space pawl extension 288a by the engagement of the stud 306 with the forward end of the slot 302d; but when the operating lever is moved from normal position, the stud 306, after a limited amount of free movement, engages the rear end of the slot 302d and moves the leg 302e into the path of swinging movement of the pawl. Thus, if the back space pawl 288 is moved free of the stud 300 by the power operated back spacing mechanism while the operating lever 170 is out of normal position, the leg 302e of the U-shaped pawl will permit translation of the pawl with the slide 292 but no rotation thereof into engagement with the rack.

It will be remembered that the main carriage is moved in a letter spacing direction across the carriage by the action of the spring motor 92 upon the tape 94 connected to the carriage. The main carriage may be returned across the frame of the machine over the bias of the spring motor by a mechanism substantially like that described in Patent No. 2,157,053. It will suffice to state here that when a carriage return key (not shown) on the keyboard is depressed, a cam unit, generally similar to the cam unit 172 for the tabulating mechanism, is rendered operative to engage a carriage return clutch and at the same time rock a clutch knockout or trip lever 308 from a normal position to a position in the path of the left-hand margin stop 278 through the medium of a link 310. The trip lever 308 is vertically mounted at an intermediate point on a stud-like fastening 312 and is connected to the link 310 at its lower end.

In order to permit the tabulating operation to take precedence over the carriage return operation in the case of accidental simultaneous depression of one of the tabulating keys 108 or 142 and the carriage return key, or in the case of the depression of the carriage return key while the tabulating operation is taking place, an interlock is provided. The interlock mechanism is mounted on the bottom of the lateral extension 136c of the frame member 136 and may be best seen in Fig. 7. It consists of a series of levers and links operatively connecting the operating lever 170 with the lower end of the clutch knockout or trip lever 308. A bell crank 314, pivoted on a stud-like fastening 315 depending from the lateral frame member extension 136c, has one of its arms 314a provided with a slotted end in which is slidably disposed a stud 316 carried by the operating lever. The other arm 314b of the bell crank is pivotally connected to one end of a link 318, the other end of which is pivotally connected on an intermediate portion of a lever 320. The end of the lever 320 is slotted and receives the pin 322a of a member 322 slidably mounted by a pair of longitudinally extending slots 322b on a pair of stud-like fastenings 324 fixed to the lateral extension 136c. The slide member 322 is formed with a lateral extension 322c movable into the path of movement of the lower end of the clutch knockout or trip lever 308. It results that when the operating lever 170 is rotated by the power unit 172, the slide 322 is shifted to a position in which it moves and/or holds the knockout lever in a clutch knockout position, thus stopping or preventing the operation of the carriage return mechanism.

An interlock is also provided to insure that the rebound pawl 242 is held out of engagement with the rebound rack 244 during the power operated carriage return operation. By interposing a lever 326a in the clutch knockout lever link 310, it is possible to move the rebound pawl, should it be in an operative position, from that position and to hold it in an inoperative position during the carriage return operation. The lever 326a is pivotally mounted on a stud 328 fixed on the extension 136b of the frame member 136 and constitutes one arm of a bell crank 326 (Fig. 3), the other arm 326b of which is movable into the path of an extension 242b (Figs. 2 and 3) of the rebound pawl 242. Since the knockout link 310 is always shifted in a direction counter to the letter spacing direction to rotate the clutch knockout lever to a raised position when the carriage return mechanism is actuated, the lever 326a of the bell crank is also always rocked during the carriage return operation to swing the arm 326b. If the rebound pawl is in engagement with the rebound rack, the rebound pawl extension 242b will be engaged by the swinging arm 326b and shifted to a position in which the toothed end of the rebound pawl is clear of the rack.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a typewriting machine or the like, a main carriage having a column stop and biased for movement in a letter spacing direction, an escapement mechanism for controlling the letter spacing movement of said main carriage, power means, a series of tabulating counter stops each positionable for movement by said power means into the path of the column stop to intercept it and dispose the carriage in a typing position different from that effected by each of the other counter stops, a corresponding series of tabulating keys, means operable upon the initial movement of each of said tabulating keys to position the corresponding counter stop, latch means associated with each of said counter stop positioning means and said power means to hold said counter stop in said position until acted upon by said power means, means operable upon further movement of the respective tabulating key to actuate said power means, and means operable by said power means to actuate the escapement mechanism.

2. In a tabulating mechanism, power means, a counter stop positionable for movement by said power means into the path of a column stop, a key for operating said counter stop, means operable upon the initial movement of said key to position said counter stop, a latch member movable with said positioning means from a normal position to a displaced position, an assembly including an element movable by the power means operable to retain the latch member in displaced position until the power means is operated, and means operable upon further movement of the said key to actuate the power means.

3. In combination, means controlled by oscillatable power means, a keeper member rockable to and from a normal position by said means controlled by oscillatable power means, a biased lever movable from a normal position to dispose an element for operation by said means controlled by oscillatable power means, a latch member pivotally connected with said lever for movement therewith and having its free end biased toward said keeper member, said keeper member being operable to retain said latch member in a displaced condition and to swing said latch member about its pivoted connection with said biased lever, and a guide member rockable by said latch member from a normal position to which it is biased and releasable to the normal position when the latch member is swung by said keeper member, said guide member after restoration to normal position being operatively disposed in the path of swinging movement of said latch member to disconnect said latch member from the keeper member when the keeper member is restored to normal position.

4. In a typewriting or like machine including a letter spacing direction biased platen supporting carriage having column and margin stops, an escapement mechanism for controlling letter spacing movement of the carriage, a back-space mechanism including a driving pawl engageable with a rack on said carriage, rebound preventing mechanism including a rebound pawl engageable with a rebound rack on said carriage and a power operated carriage return mechanism having a control linkage, a second carriage biased for movement from a normal position to an advanced position, a series of tabulating counter stops mounted on said second carriage in side by side contact and slidable independently of each other to a position in which they may be swung into the path of the column stop, a corresponding series of tabulating keys, linkage operable upon initial movement of each key to slide the corresponding counter stop to the swinging position, a biased bail member operable when released from a normal position to swing the raised counter stop into the path of the column stop and when restored to swing it back out of said path, an operating lever for said bail member biased to a normal position in which it holds the bail member in normal position, a cam operated power unit to move said operating lever from its normal position, cooperating latch means on said operating lever and said second carriage to hold the second carriage in normal position when the operating lever is in normal position and to hold the operating lever out of normal position when the second carriage is in the advanced position, linkage operable upon movement of the operating lever from normal position to actuate the escapement mechanism, linkage operable upon movement of said operating lever from normal position to block said backspace pawl from engagement with said rack, linkage operable upon movement of said operating lever from normal position to hold the control linkage for the power operated carriage return mechanism in an inactive condition, cooperating latch means associated with said counter stop sliding linkage and said cam operated power unit to hold the slid counter stop in the swingable position until the power unit is operated, linkage means operable upon further movement of the respective key to actuate said cam operated power unit, and linkage operable upon the actuation of the control linkage for the carriage return mechanism to hold the rebound pawl out of engagement with the rebound rack.

References Cited in the file of this patent

UNITED STATES PATENTS

| | | |
|---|---|---|
| 2,185,742 | Thompson | Jan. 2, 1940 |
| 2,267,947 | Pitman | Dec. 30, 1941 |
| 2,353,095 | Von Reppert | July 4, 1944 |
| 2,580,318 | Pitman | Dec. 25, 1951 |